United States Patent [19]

Sheely et al.

[11] Patent Number: 4,979,448
[45] Date of Patent: Dec. 25, 1990

[54] APPARATUS AND METHOD FOR RECOVERY OF CONSTITUENTS AND HEAT FROM FLUIDIZED BED COMBUSTION

[75] Inventors: Harold R. Sheely, Orleans; Constantine D. Miserlis, Arlington, both of Mass.; Ivan L. Rosenblatt, Birmingham, Ala.

[73] Assignee: International Paper Company, Purchase, N.Y.

[21] Appl. No.: 461,695

[22] Filed: Jan. 8, 1990

[51] Int. Cl.$^5$ ............................................. F23G 5/00
[52] U.S. Cl. .................................. 110/346; 110/245; 110/238
[58] Field of Search .............. 122/4 D; 110/245, 238, 110/346

[56] References Cited

U.S. PATENT DOCUMENTS

| | | | |
|---|---|---|---|
| 3,119,379 | 1/1964 | Sweeney | 122/4 |
| 3,306,236 | 2/1967 | Campbell | 110/8 |
| 3,431,892 | 3/1969 | Godel | 122/4 |
| 3,480,408 | 11/1969 | Lacroix | 23/288 |
| 3,574,051 | 4/1971 | Shah | 162/30 |
| 3,645,237 | 2/1972 | Seth | 122/4 |
| 3,717,700 | 2/1973 | Robison | 423/244 |
| 3,910,235 | 10/1975 | Highley | 122/4 |
| 4,165,717 | 8/1979 | Reh et al. | 122/4 |
| 4,249,472 | 2/1981 | Mitchell | 110/245 |
| 4,363,292 | 12/1982 | Engstrom | 122/4 |
| 4,462,319 | 7/1984 | Larsen | 110/238 |
| 4,522,154 | 6/1985 | Taylor et al. | 122/4 D |
| 4,552,097 | 11/1985 | Jarmuzewski | 122/4 D |
| 4,565,139 | 1/1986 | Sage et al. | 122/4 D |
| 4,594,967 | 6/1986 | Wolowodiuk | 122/4 D |
| 4,709,663 | 12/1987 | Larson et al. | 110/245 |
| 4,757,771 | 7/1988 | Narisoko et al. | 110/245 |
| 4,869,207 | 4/1989 | Engstrom et al. | 110/245 |

*Primary Examiner*—Henry C. Yuen
*Attorney, Agent, or Firm*—Luedeka, Hodges & Neely

[57] ABSTRACT

An apparatus and method for recovering constituents and/or heat energy from a fluidized bed combustion process utilizes a single vessel which combines a combustor for fluidized bed combustion of a chemical mixture fed therein and a heat exchange section. Characteristics of the fluidized bed are controlled by withdrawing an appropriate portion of the larger, unburned constituent particles from the bottom of the combustor, and smaller constituent particles are withdrawn by becoming entrained within the gases of combustion and being transported to the heat exchange section. The smaller particles are separated from the gases without the use of a cyclone separator and accumulate as another fluidized bed in the heat exchange section where heat is adsorbed from the particles for recovery purposes and to cool the particles. A portion of the cooled particles is then recirculated to the combustor by, for example, pneumatic transport methods for controlling the operating temperature of the combustion process. The apparatus is particularly well-suited for recovering process salts and heat energy from the burning of black liquor effluent from a lignocellulosic pulping process.

8 Claims, 3 Drawing Sheets

APPARATUS AND METHOD FOR RECOVERY OF CONSTITUENTS AND HEAT FROM FLUIDIZED BED COMBUSTION

This invention relates generally to apparatus and methods for recovering chemical constituents and/or heat energy from a fluidized bed combustion process and relates more particularly to such apparatus and methods for recovering chemical constituents and/or heat energy from feed material delivered to a fluidized bed combustion process.

The type of fluidized bed combustion processes with which this invention is concerned includes such processes involved in the chemical pulping of lignocellulosic material, the fluidized bed combustion of high and/or low sulfur fuels, fluidized bed catalytic processing, fluidized bed gasification of fuels, and the generation of exothermic or endothermic reactions in which heat is desired to be extracted from or added to the reaction zone.

In processes involving the chemical pulping of lignocellulosic material, it is known that reusable sodium constituents in the form of process salts can be recovered from the burning of spent, or black, pulping liquor. One prior art system for recovering such process salts involves three separate equipment elements: a fluidized bed combustor; a cyclone separator; and an external heat exchanger. During operation of the conventional system, black liquor is supplied to the combustor and burned in a multi-solids fluidized bed environment comprised of process salts derived from the combusting of black liquor. The process salts include small particles which become entrained within the combustion gases from the combustor and larger particles, or prills, which remain within the combustor bed medium. Prills are removed from the bottom of the combustor for reuse during a pulping process and for controlling the accumulation or inventory of prills in the combustor.

The combustion gases and entrained salts are conducted from the combustor and enter the cyclone separator where the salts are separated from the gases. The combustion vapors then exit the separator as salt-free off gas, and the separated salts are directed from the separator and into the external heat exchanger. The separated salts accumulate in a bed within the heat exchanger, and heat exchange tubes positioned within the bed transfer heat from the bed to water directed through the tubes for the purpose of generating steam and to cool the accumulated salts. A portion of the cooled salts are returned to the combustor for controlling its operating temperature.

A disadvantage associated with the discussed above prior art system, relates to its separate combustor and heat exchange vessels. The separate vessels contribute to relatively large heat losses due to the relatively large amount of vessel surface area which is normally exposed to surroundings of lower temperature. Moreover, the separateness of the vessels contributes to the complexity and cost of the conventional system. In addition, the cyclone separator of the type used in the aforedescribed system is limited in that its operation is sensitive to the pressure drop across the separator, and the more desirable separator efficiencies are reached only at higher operating rates. Thus, the system does not operate efficiently at turndown conditions.

Accordingly, it is an object of the present invention to provide a new and improved system and method for recovering chemical constituents from a fluidized bed combustion process, such as one involving the burning of spent pulping liquid, and/or for recovering heat energy from the combustion process.

Another object of the present invention is to provide such a system and method which circumvents the need for a cyclone separator and wherein entrained particles are separated from the combustion gases with less sensitivity to pressure drop and with improved separating efficiency.

A further object of the present invention is to provide such a system and method which results in lower heat losses and is less costly and less complicated in construction than that of the aforedescribed prior art system which utilizes separate combustor and heat exchange vessels.

Other objects and advantages will become known by reference to the following description and the accompanying drawings.

The system of the invention combines a fluidized bed combustor and a heat exchanger, which incorporates a large solids-gas disengagement zone and a fluidized bed heat transfer zone, within a single composite vessel. The vessel includes a combustor section within which a fluidized bed combustion process takes place; a fluidized heat transfer section connected to the combustor section which aids in the control of the combustion section as well as provides heat recovery through, for example, the generation of steam; and a solids disengagement section which provides an efficient separation of entrained particles from the combustor section and combustor flue gases. Briefly, a chemical mixture is directed into the combustor where it is burned in a fluidized bed medium comprised of both small and large particles of unburned constituents. In the system, the large particles remain in the fluidized bed medium while the small particles become entrained within the combustion gases generated by the combustion process and are transported by those gases to the fluidized heat exchange section by way of the disengagement section. Upon entering the disengagement section, which is disposed generally above the fluidized heat exchange section, the entrained particles are efficiently separated from the combustion flue gases. During operation of the system, the larger particles are withdrawn from the fluidized bed medium for storage and reuse, and heat energy is extracted from the small particles in the heat exchange section of the vessel for the purpose of recovering heat energy from the combustion process.

Figure 1:
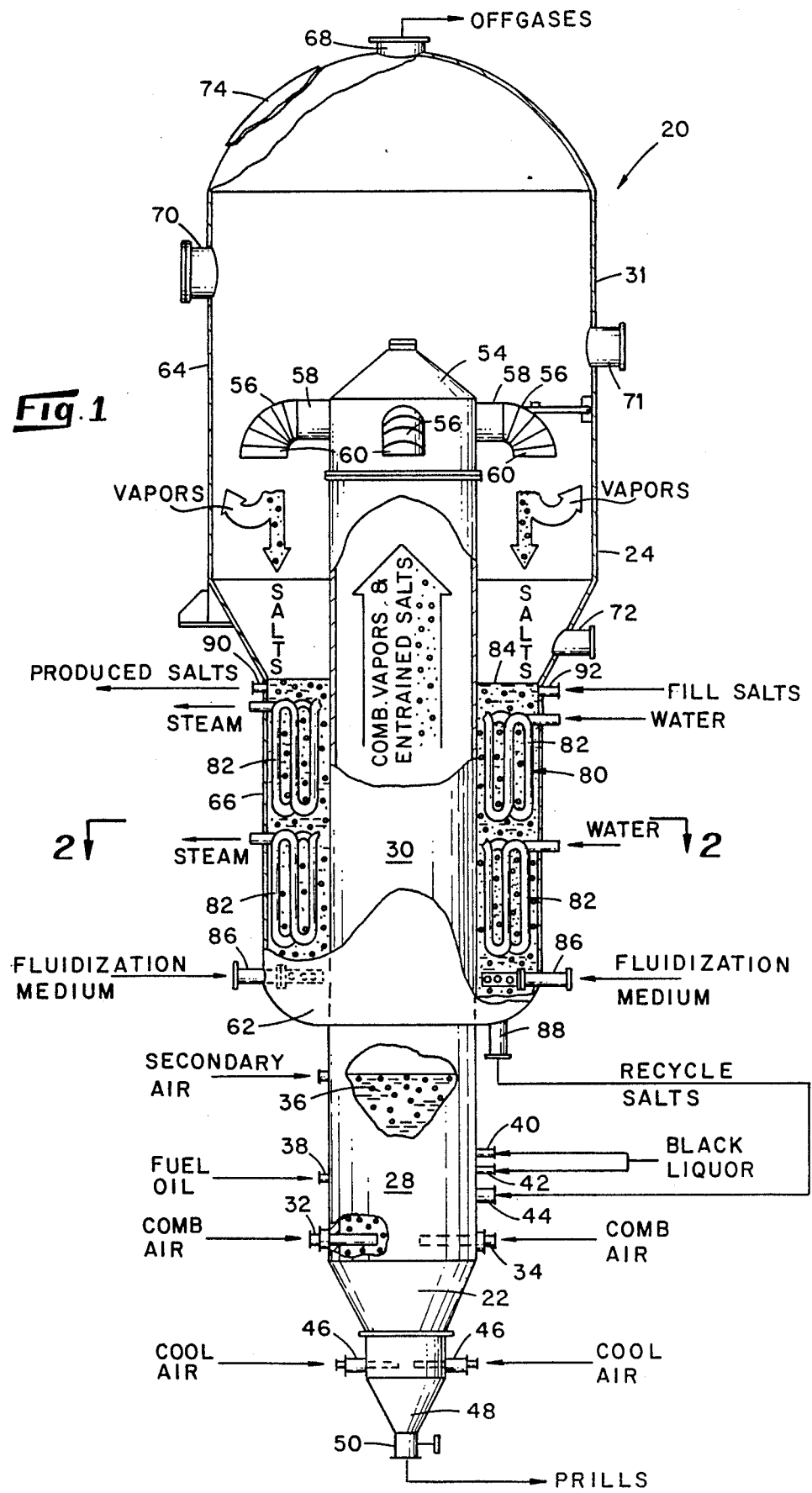
FIG. 1 is a side elevation view, shown partially in section, of one embodiment of an apparatus for recovering chemical constituents from a fluidized bed combustion process and/or for recovering heat energy from the combustion process.

Turning now to the drawings, there is shown in FIG. 1 a combination combustor/heat exchange system or vessel 20 having a combustion section 22 and a heat exchange section 24. The vessel 20 described herein is used in the recovery of process salts from the burning of black pulping liquor associated with lignocellulosic pulping processes and/or the recovery of heat from the burning of the black liquor. However, it will be understood that the vessel 20 may be adapted for use in applications in which other substances, such as those including oil, gas, coal, petroleum coke or peat, are burned for the purpose of recovering constituents and heat energy from the burned mixture. Accordingly, the principles of the present invention can be variously applied.

The combustion section 22 of the vessel 20 is in the form of an elongated tubular chamber 26 arranged for use in a substantially vertical orientation. The chamber 26 includes a lower portion 28 containing a fluidized bed medium 36 and an upper portion 30. The heat exchange section 24, on the other hand, includes a relatively large shell 31 positioned about the upper chamber portion 30 for receiving combustion gases emitted from the combustion section 22. Preferably, the chamber 26 and the main portion of the shell 31 disposed above the heat exchange tubes 82, described herein, include an outer layer of low grade steel and an inner layer of a suitable refractory material. On the other hand, the portion of the shell 31 disposed below the tubes 82 preferably includes a layer of a higher grade of steel and an outer layer of insulation. To avoid abnormal thermal stresses at the interface with shell 31 due to the high metal temperatures which result with the upper portion 30 of the combustion section 22 begin encompassed, the upper portion 30 is of a higher grade of steel comparable to that of the shell 31 and is internally refractory-lined.

Connected to the lower chamber portion 28 are a plurality of conduits providing passageways through which various fluids are directed during the vessel operation. For example, there are provided air inlet conduits 32, 34 through which combustion air is delivered to the fuel in the vicinity of the bed medium 36, and there is provided an oil or gas inlet conduit 38 through which alternative fuel is delivered to the bed medium 36 for maintaining the combustion process, should it be required. The black liquor to be burned is fed into the combustor section 22 through the conduits 40, 42, and recycled salts which are withdrawn from the heat exchange section 24 for recycling purposes are directed into the combustion section 22 through the conduit 44, or alternately through a series of conduits arranged in parallel to conduit 44. In addition, conduits 46 located adjacent the bottom of the chamber 26 conduct cooling air to the bed medium 36 for cooling purposes described herein and to facilitate bottoms removal.

As viewed in FIG. 1, the bottom of the combustor section chamber 26 terminates in a downwardly-directed conical section 48, and a conduit 50 extends downwardly from the section 48. The conduit 50 provides a passageway or outlet through which desired constituents are drawn from the bed medium 36 for the purpose of recovering the constituents and for purposes of maintaining the level of the fluidized bed medium 36 at a predetermined level. The means of removal of the recovered constituents may be by way of, for example, gravity flow and pneumatic transport.

At start-up of a combustion process, black liquor fuel, and combustion air are delivered to the combustor section 22 for burning in the bed medium 36. Preferably, the combustion air is pre-heated by a gas-fired pre-heater (not shown), and introduced within the combustor section 22 in its pre-heated condition. Once the temperature of the combustor section 22 has been raised to above 1100° F. with the preheated air, black liquor is directed through the inlet conduits 40, 42 for initiating the combustion reaction. Alternatively, once the temperature of the combustor section 22 has been raised to about 600° F. with the pre-heated air, oil is directed through the inlet conduit 38 for initiating the combustion reaction. Black liquor is then added through conduits 40, 42 when the bed temperature reaches 1100° F. Following start-up, the combustion process may be substantially self-sustaining so that the flow of fuel can be shut off and added only when necessary for the generation of more steam, as described herein, than can be obtained by burning black liquor or for the generation of steam when no black liquor is available. The black liquor is introduced into the combustion section 22 through spray nozzles associated with the inlet conduits 40, 42 and mixes with atomizing air at the inlet of the spray nozzles. Combustion air is fed into the combustor section through nozzles associated with the conduits 32, 34 and through a multi-ring split distributor to ensure uniform distribution of the air across the bed medium 36.

The burnable, or organic, materials contained in the black liquor feed are burned in the combustor section 22 in the presence of fluidized solids comprising the bed medium 36. The solids of the bed medium 36 include both large and small salt particles forming a dense bed from the inorganic portion of the black liquor. The larger particles are referred to herein as "prills", while the smaller particles are referred to herein as "entrained salts". Prills may, for example, include the salt particles which are larger in diameter than about one-eighth inch while the entrained salts may, for example, include the salt particles which are smaller in diameter than about one-eighth inch. Operation of the combustor section 22 is controlled so that the velocity of air and the gaseous products of combustion directed through the combustion section 22 is large enough to entrain the smaller particles and levitate them upwardly through the chamber 26 but is small enough so that the prills remain within the bed medium 36. Within the combustion bed 36, salt particles are sintered at a controlled rate and attach to one another to form larger salt particles so that prills are continually formed within the chamber 26. When the prills accumulate to a predetermined amount, a portion of the prills are removed through the conduit 50 and transported pneumatically and crushed for reuse by way of, for example, sonic velocity attrition. Prior to removal, the prills are cooled with cooling air fed through the cooling air conduits 46.

For the purpose of guiding the combustion gases and entrained salts into the shell 31, a top combustor head 54 is associated with the upper portion 30 of the combustor section chamber 26. In operation, the head 54 alters the direction of flow of combustion gases and entrained salts moving through the chamber 26 so that the gases and entrained salts enter the shell 31 along a downward path. Although the combustion gases and entrained salts may be directed downwardly into the shell 31 by any of a number of suitable structures, the head 54 in the depicted embodiment includes guide conduits 56 joined in flow communication with the chamber 26 and which extend generally radially outwardly from the chamber 26. Each conduit 56 includes a horizontally-arranged portion 58 joined directly to the combustor chamber 26 and a free end portion 60 opening generally downwardly into the shell cavity. If desired, a baffle arrangement can be incorporated within the conduits 56 to promote a uniform flow pattern of gases and salts entering the shell 31.

The head conduits 56 are relatively small in cross section in comparison to the cross section of the shell cavity into which the combustion gases and entrained salts are discharged. Therefore, as the gases and entrained salts exit the conduits 56 and enter the shell cavity region referred to, for present purposes, as a "disengaging zone", the gases experience a rapid rate of deceleration. Such a deceleration of the gases permits the entrained salt particles to fall out of the gases under the effects of gravity toward the bottom of the shell cavity. It will be understood, however, that the velocity of the gases moving through the downwardly-opening portions 60 of the conduits 56 imparts an inertia to the entrained particles that tend to maintain the downward velocity of the particles entering the disengaging zone, even though the gases decelerate rapidly upon entering the zone. The maintenance of the downwardly-directed velocity of the entrained particles entering the disengaging zone enhances the separation of the particles from the gases, and the provision of the head conduits 56 for directing the gases and entrained particles downwardly is advantageous in this respect.

With reference still to FIG. 1, the shell 31 of the heat exchange section 24 is elongate in form and arranged generally vertically. An opening 62 is provided in the lower end of the shell 31, and the combustor section chamber 26 is arranged within the shell opening 62 so that the chamber lower portion 28 is positioned below the shell 31 and the chamber upper portion 30 extends upwardly into the shell cavity. The shell 31 includes an upper section 64 having substantially cylindrical sidewalls and which provides the disengaging zone within which combustion gases and entrained particles exit the head conduits 56. The shell 31 also includes a lower section 66 having substantially cylindrical sidewalls of reduced diameter within which salt particles accumulate which have been separated from the combustion gases. For purposes of permitting combustion gases to escape from the shell 31, a flue gas outlet 68 is provided within the shell top. During vessel operation, combustion gases exit the chamber 26 through the head 54 and flow upwardly and out of the shell 31 through the flue gas outlet 68. For purposes of providing access to the interior of the shell 31, access ports 70, 71, 72 are provided in the shell sidewalls, and for insulating the heat exchange section 24, the upper portion of the shell 31 (i.e., section 64) is insulated with a thick layer 74 of suitable insulation.

Figure 2:
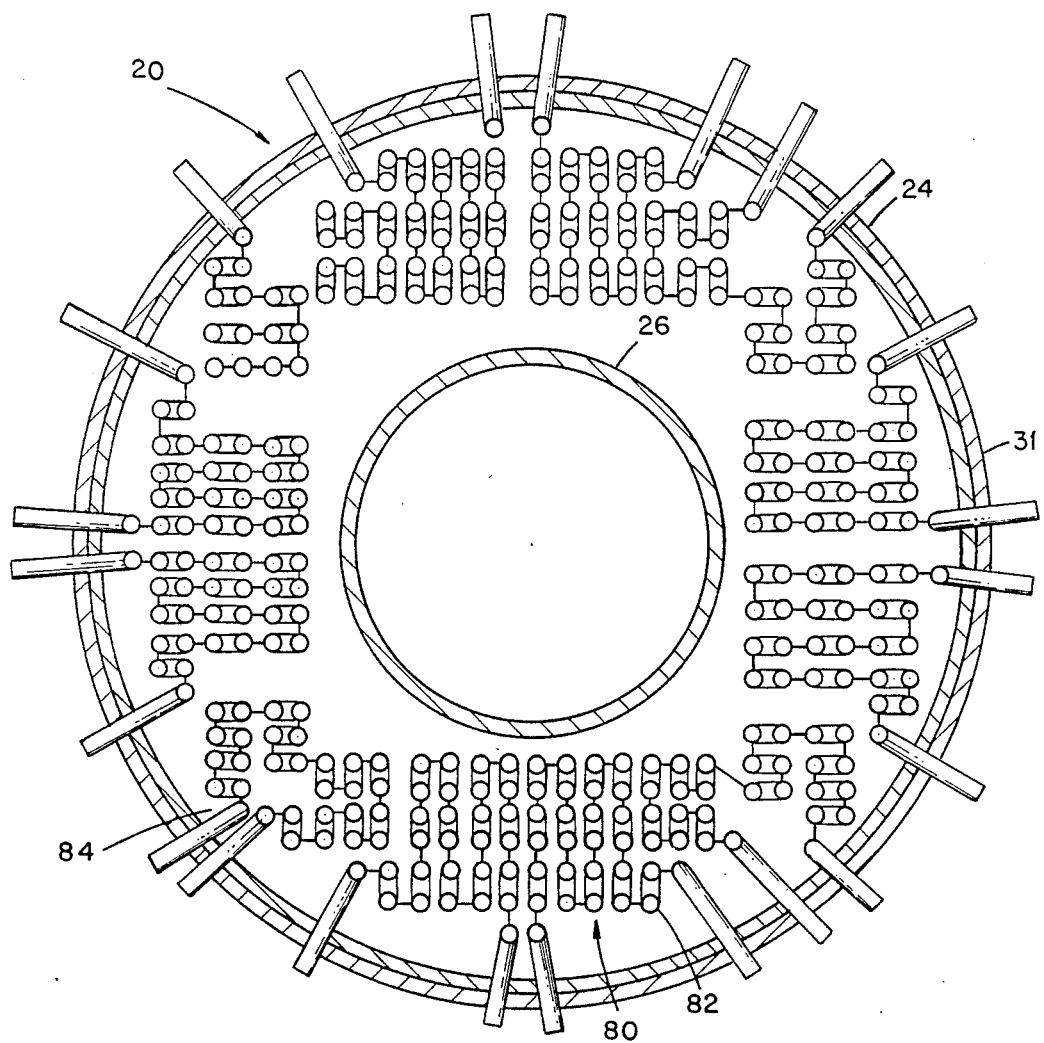
FIG. 2 is a cross-sectional view taken along line 2—2 of FIG. 1.

With reference to FIGS. 1 and 2, heat exchange means 80 are associated with the lower section of the shell 31 for recovering some of the heat energy generated during the fluidized bed combustion process carried out in the combustor section 22. To this end, the heat exchange means 80 includes a plurality of heat exchange pipes 82 arranged within the shell lower section 66 and routed therethrough in a serpentined fashion as shown in U.S. Pat. No. 3,679,373. These pipes may be arranged vertically or horizontally. They may also consist of continuous coils or banks. In the latter instance, the steam and water distribution headers may be located inside or outside the reactor as is well known to those skilled in the art. During vessel operation, water is pumped through the pipes 82 for the purpose of generating steam from the heat transferred from the separated salt particles which accumulate in the shell lower section 66. In addition, the water pumped through the pipes 82 cools the accumulated salt particles to reduce the likelihood that the accumulated particles will stick to one another within the shell 31.

Salt particles which fall into the lower section 66 of the shell 31 accumulate within a bed 84 whose level is maintained above the level of the heat exchange pipes 82. Therefore, the heat exchange pipes 82 are totally submerged within the bed 84 to reduce the likelihood that the hot salt particles emitted from the head conduits 56 will stick to the cooler surfaces of the heat exchange pipes 82. In addition, the bed 84 of collected salt particles are maintained in a fluidized state by the introduction of a fluidizing medium, such as air, through fluidization inlet conduits 86 located adjacent the lower end of the shell 31. During vessel operation, the amount of fluidizing air introduced through the inlet conduits 86 is maintained at the minimum amount necessary to fluidize the bed 84 and to promote good heat transfer.

For purposes of withdrawing an amount of the collected salts for recycling to the combustor section 22 through conduit 44, a draw-off connection 88 associated with the lower section 66 of the shell 31 permits a continuous removal of salt from the bed 84. The connection 88 is suitably joined to the recycle conduit 44 for directing the salt particles which are removed from the bed 84 into the combustor section 22. When introduced back into the combustor section 22, the removed salt particles are again exposed to the heat of combustion so that by sintering and sticking together, the removed particles contribute to the formation of prills within the combustion section 22. In addition, the removed salt particles serve to cool the combustor section 22 and hence provide a positive method for controlling the temperature of the combustion reaction. Another draw-off connection 90 permits the continuous withdrawal of net salt production, and still another connection 92 allows for periodic makeup or withdrawal of salt particles to accommodate changes in the feed of black liquor to the combustor section 22. In operation, salts are withdrawn from or added to the bed 84 of the lower shell section 66 through the appropriate connections 88, 90, 92 so that the bed 84 is maintained at a preselected level above the heat exchange pipes 82.

Following operation start-up, black liquor, combustion air and recycled salts are introduced into the combustor section 22 at controlled rates for controlling characteristics of the combustion process, such as operating temperature, height of the bed medium 36, prill size distribution, and chemical composition of the bed medium 36. To ensure complete burning of the black liquor introduced within the combustor section 22 and to reduce the likelihood that solids formed by the combustion process will become tacky and stick to surfaces within the vessel 22, the combustion process temperature is maintained within the range of about 1100° to 1250° F., and preferably at about 1200° F. With the aid of the combustion air added through the cooling conduits 46, the prills which accumulate in the bottom of the combustor section tube 26 are cooled to about 1000° F. prior to withdrawal. For controlling the temperature of the bed 84 of salt particles collected in the heat exchange section 22, water is pumped through the heat exchange pipes 82 at controlled rates. Preferably, the collected salts are cooled within the bed 84 to within the range of about 400° F. to 850° F.

It follows from the foregoing that the system and method accomplishes its intended purposes and objectives. A single vessel 20 has been described which combines a fluidized bed combustor section 22 with a heat exchange section 24 for the purpose of recovering unburned constituents and heat energy from a fluidized bed combustion process. The vessel 20 is particularly well-suited for recovering salt and/or heat energy from a burning of spent pulping liquor from a lignocellulosic pulping process. Entrained salts are efficiently separated from combustion gases in the vessel 20 without a cyclone separator, and heat losses from the vessel 20 are less than those associated with conventional systems employing a separate combustor and heat exchange section due to the smaller amount of vessel surface area which is exposed to surroundings at lower temperature.

Figure 3:
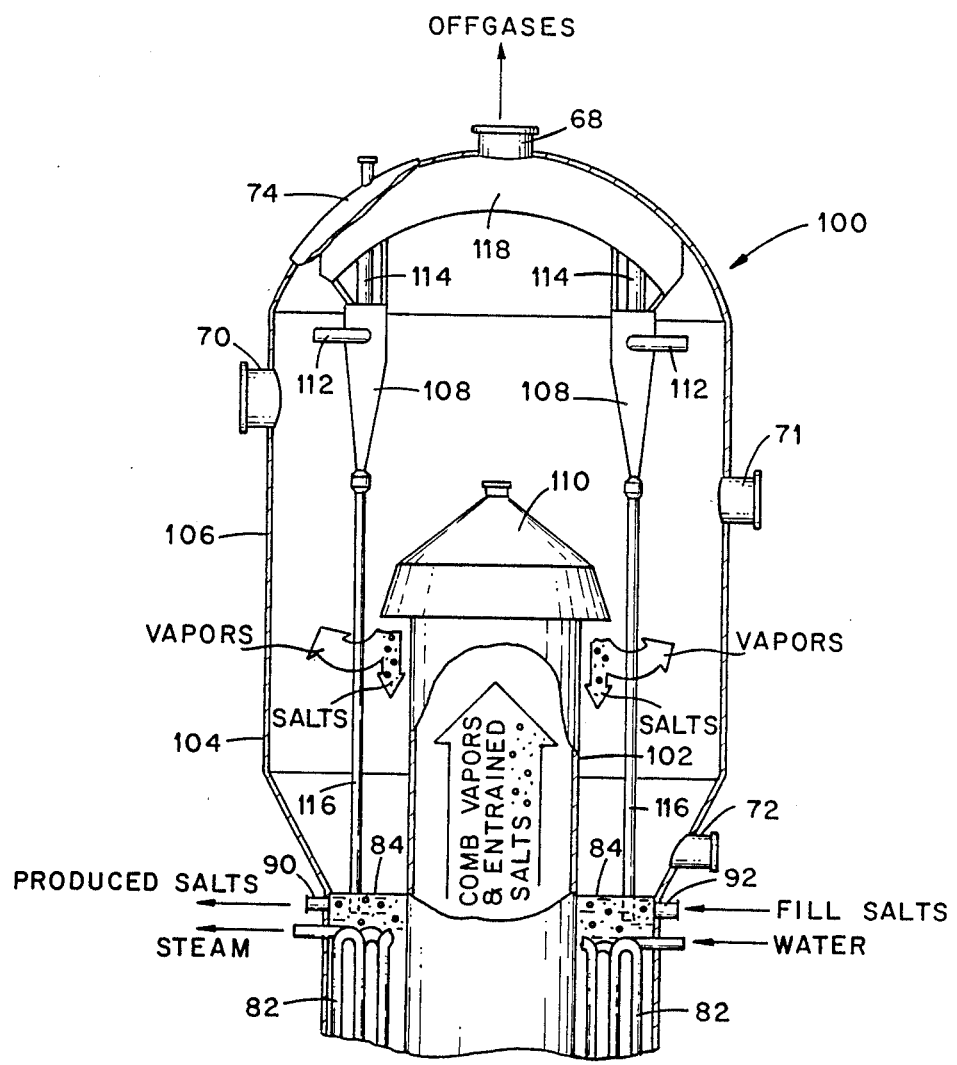
FIG. 3 is a view, similar to that of FIG. 1, of a fragment of another embodiment of an apparatus for recovering chemical constituents and/or heat energy from a fluidized combustion process wherein internal cyclones are provided.

While the combustor head 54 of the system 20 effects an efficient separation of entrained salts from the combustion gases as the head 54 directs the flow of salts and combustion gases downwardly into the disengaging zone of the shell 31, it may be desirable in some applications that the separation efficiency be improved over the efficiency achieved by the system 20. To improve separation efficiency, a cyclone separator system can be incorporated within the shell 31. For example, there is illustrated in FIG. 3, a system 100 having a combustor section 102, a heat exchange section 104 having a shell 106 positioned about the upper portion of the combustor section 102 and eight cyclone separators 108, (only two shown) mounted within the shell 106 so as to be regularly positioned about the vertical centerline of the shell 106. Positioned atop the combustor section 102 is a combustor head 110 for directing the flow of combustion gases and entrained salts which exit the combustor section 102 along a downward path. Other components of the system 100 which correspond to those of the system 20 of FIGS. 1 and 2 accordingly bear the same reference numerals.

Each cyclone separator 108 includes an inlet plenum 112, an outlet plenum 114 and a dip leg 116 which extends downwardly to a location below the level of the particle bed 84. Each outlet plenum 114 is operatively joined in flow communication with the flue gas outlet 68 by means of a plenum chamber 118 so that combustion gases which exit the combustor section 102 must pass through the separators 108 before exiting the shell 106. When passing through the separators 108, salt particles which remain entrained within the combustion gases entering the inlet plenums 112 are separated from the gases and fall to the particle bed 84 through the dip legs 116. Hence, the separators 108 act as polishing mechanisms for separating entrained particles from the flow of gases exiting the combustor section 102 which may not be separated within the disengaging zone. Preferably, the dip legs 116 extend below the level of the particle bed 84 by at least one foot to provide a positive pressure seal with the bed 84 so that any need for a flapper valve within the dip leg 116 is obviated. The positioning of the cyclone separators 108 within the shell 106 provides an advantage in that the separators 108 do not experience the heat losses or thermal stresses that they may otherwise experience if they were outside the shell 106 and exposed to ambient conditions. In addition, the separation efficiency of the separators 108 need not be as great as that normally required for a stand-alone separator due to the fact that most salt particles separate from the gases upon exiting the combustor head 110.

Although the aforedescribed system 20 has been shown and described as being used in connection with the recovery of constituents and heat in the chemical pulping of lignocellulosic material, the system may find use in other processes. For example, one such process may involve the fluidized combustion of high sulfur fuel wherein the fluidized bed material could be calcium carbonate. In operation, the calcium carbonate would react with the sulfurous gases from the flue gas yielding calcium sulfide or sulfate. Bed material could be removed through the prill port or as overflow from the heat exchanger section. Makeup constituents could be added into the heat exchanger section or the combustor. Another such process may involve the fluidized combustion of low sulfur fuels wherein the fluidized bed material could be inert materials, such as sand and iron ore.

Still another process may involve fluidized catalytic processing including the catalytic cracking of oil or the catalytic combustion of fuels. In such a case, the fluidized bed material is the catalyst. For example, a chromium oxide catalyst could be impregnated on a porous alumina, spherical substrate. A small size substrate could be used for the particle bed of the heat exchanger section, and a large size substrate could be used for the dense bed of the combustor. During operation, as the dense bed material attrits in size to become smaller, the material reaches the point where it is transported to the heat exchanger section and becomes part of the particle bed therein. The transported material also serves the purpose of removing heat from the reaction site.

Yet another process may include fluidized bed gasification of various fuels such as wood, bark, coal, lignite or peat. In this case, a small portion of the fuel is combusted in the system to provide the energy needed to overcome the reaction endotherm. For fuels which produce a large amount of ash, such as black liquor, the ash could serve as the combustor bed material. For fuels which do not produce a large amount of ash or where the ash does not agglomerate to form prills, the bed material could be made of an inert material such as sand or iron ore.

A further process may involve the conducting of any exothermic chemical reaction where heat is desired to be removed from the reaction zone. A gas phase species could be reacted with a liquid phase species in such a reaction, but it would also be appropriate to react two liquid phase species in a bed of inert materials, or a liquid or gas phase species with a solid phase species which constitutes the bed material.

In addition, the aforedescribed system 20 can be operated in a manner in which heat transported to the combustor section by way of the draw-off connections 88. For example, in an endothermic reaction, heat could be introduced through the heat exchange tubes 88 in the heat exchange section 24 for absorption by the bed of small particles collected in the heat exchange section 24. Then, the heat entrained within the particles can be transported through the draw-off connections 88 for providing heat to the reaction, or combustion section, bed.

It will be understood that numerous modifications and substitutions can be had to the aforedescribed embodiments without departing from the spirit of the invention. For example, although the shell 31 of system 20 has been shown and described as including a pair of cylindrical sections arranged in an end-to-end fashion, the shell 31 could be formed as a single, large sphere. Such a sphere may be preferred over the end-to-end cylinder arrangement if the shell is to be pressurized during use. Furthermore, although prills produced in the system 20 have been described as withdrawn from the combustion section 22 and crushed for storage or reuse, the crushed prills may be delivered into the heat exchanger bed 84 through conduit 92 to provide bed make-up, and the salts for storage or reuse may be withdrawn from the heat exchanger bed 84. Accordingly, the aforedescribed embodiments are intended for the purpose of illustration and not as limitation.

What is claimed is:

1. A method for recovering chemical constituents or heat energy from a fluidized bed combustion process comprising the steps of:

burning an organic-containing chemical mixture in a fluidized bed combustion process so that the combustion bed medium is comprised of large and small unbruned particles and wherein the small particles become entrained within a flow of combustion gases attending the combustion process;

withdrawing an amount of the large particles from the bed medium for recovery purposes;

separating the entrained small particles from the combustion gases by routing the flow of combustion gases into a zone in which the gases decelerate and change direction and the entrained particles fall out of the decelerating gases and accumulate in a bed, said step of separating including a step of directing the flow of combustion gases into the deceleration zone along a downward path so that downward momentum imparted to the entrained particles as the gases decelerate and change direction facilitates the separation of the particles from the gases;

conducting the substantially particle-free gases from the zone;

extracting heat from the accumulated small particles to thereby recover heat energy from the combustion process; and recirculating an amount of cooled accumulated particles to the combustion bed for controlling the operating temperature of the combustion process.

2. The method as defined in claim 1 wherein said step of burning is carried out close to or above the softening point of the unburned particles and said step of extracting heat cools the accumulated small particles to a point substantially below the softening point of the unburned particles.

3. The method as defined in claim 1 wherein said step of extracting heat includes a step of directing a heat exchange medium through the bed of accumulated small particles so that heat is absorbed from the accumulated small particles.

4. The method as defined in claim 3 wherein said heat exchange medium is one of a group consisting of water, steam and combustion air and the heat adsorbed from the accumulated particles converts the medium into hot water or steam when the medium is water, superheats the medium when the medium is steam, or converts the medium into hot combustion air when the medium is combustion air.

5. The method as defined in claim 1 wherein said step of withdrawing an amount of the large particles includes a step of cooling the larger particles appreciably below their softening temperature so that the withdrawn salts are relatively cool.

6. A method for recovering process salts from black liquor effluent from a lignocellulosic pulping process comprising the steps of:

burning the black liquor in a combustion bed contained within a vertically-oriented chamber wherein the combustion bed is comprised of large and small particles of process salts formed by the burning of black liquor within the range of about 1100° F. to 1250° F. and is levitated by air introduced air is such that the large salt particles remain within the bed and the small salt particles are transported with the gases of combustion from the bed;

directing combustion gases and transported salts along a downward path into a zone within which the gases decelerate and change direction following initiation of movement along the downward path to impart downward momentum to the entrained particles as the gases decelerate and change direction so that the transported salt particles separate from the gases and accumulate in a bed of collected salts;

conducting the substantially salt-free gases from the deceleration zone;

cooling the bed of collected salts below about 850° F. to minimize reconglomeration;

recycling a portion of the cooled salts to the vertically-oriented chamber to control the temperature of the liquor-burning operation; and withdrawing an amount of the larger salt particles from the combustion bed to maintain the combustion bed at a preselected level and for reuse of the withdrawn salts in a pulping process.

7. The method as defined in claim 6 wherein the step of cooling includes the steps of levitating the bed of collected salts about heat exchange tubes and directing a heat exchange medium through the tubes so that heat energy is transferred from the bed of collected salts to the heat exchange medium.

8. The method as defined in claim 6 wherein said step of withdrawing an amount of the larger salt particles is preceded by a step of cooling the larger salt particles to about 1000° F. so that the withdrawn salts are substantially cooler than the liquor-burning operation.

* * * * *

UNITED STATES PATENT AND TRADEMARK OFFICE
CERTIFICATE OF CORRECTION

PATENT NO. : 4,979,448

DATED : December 25, 1990

INVENTOR(S) : Harold R. Sheely, Constantine D. Miserlis and Ivan L. Rosenblatt It is certified that error appears in the above-identified patent and that said Letters Patent is hereby corrected as shown below:

Column 9, line 16 (Claim 1), delete "unbruned" and insert --unburned-- therefor;

Column 10, line 19 (Claim 6), before "air" insert --into the chamber and wherein the velocity of the introduced--.

Signed and Sealed this

Fifth Day of May, 1992

*Attest:*

DOUGLAS B. COMER

*Attesting Officer*    *Acting Commissioner of Patents and Trademarks*